United States Patent [19]

Angelillo

[11] Patent Number: 4,911,505

[45] Date of Patent: Mar. 27, 1990

[54] SERVO-BRAKE-AUTO-MODULATOR FOR A TRAILER PROVIDED WITH A PNEUMATIC BRAKING SYSTEM WITH SPRUNG PARKING-BRAKE MEMBERS

[75] Inventor: Domenico Angelillo, Sesto S. Giovanni, Italy

[73] Assignee: Industrie Magneti Marelli S.r.l., Milan, Italy

[21] Appl. No.: 244,381

[22] Filed: Sep. 15, 1988

[30] Foreign Application Priority Data

Sep. 15, 1987 [IT] Italy .............................. 53647/87[U]

[51] Int. Cl.[4] ........................... B60T 8/18; B60T 13/22
[52] U.S. Cl. .................................... 303/22.8; 303/71; 303/13; 188/195
[58] Field of Search .................... 303/7, 9.66, 9.76, 13, 303/14, 22.1, 22.2, 22.4, 22.8, 56, 40, 71; 188/170, 195

[56] References Cited

U.S. PATENT DOCUMENTS 3,294,455 12/1966 Valentine .............................. 303/13
3,411,833 11/1968 Alfieri ................................ 303/13 X
4,593,954 6/1986 Campanini ......................... 303/71 X
4,726,626 2/1988 Angelillo ........................... 303/22.1

FOREIGN PATENT DOCUMENTS 0155158 7/1987 Japan ................................. 303/22.1
2013298 8/1979 United Kingdom ............... 303/22.1
2083876 3/1982 United Kingdom ............... 303/22.1

Primary Examiner—Andres Kashnikow
Assistant Examiner—Timothy Newholm
Attorney, Agent, or Firm—Sughrue, Mion, Zinn, Macpeak & Seas

[57] ABSTRACT

A servo-brake-auto-modulator of the kind for use in a trailer provided with a pneumatic braking system is modified so as to enable also the achievement of the functions of an anti-overload valve. To that end a discharge passage (26) which communicates with the atmosphere is formed in an inlet chamber (22) of the body (51) of the servo-brake-auto-modulator (20) in such a position that a control member (47) in one of its working positions, causes a control chamber (33) to be connected to said discharge passage (26), preventing overloading of the parking-brake members (6).

1 Claim, 3 Drawing Sheets

SERVO-BRAKE-AUTO-MODULATOR FOR A TRAILER PROVIDED WITH A PNEUMATIC BRAKING SYSTEM WITH SPRUNG PARKING-BRAKE MEMBERS

BACKGROUND OF THE INVENTION

The present invention relates to a servo-brake auto-modulator for a trailer provided with a pneumatic braking system.

For reasons of safety, it has recently been proposed that pneumatic braking systems should be adopted, which have sprung parking-brake members which can be operated by means of a parking distributor interposed in the supply line and operable manually to discharge this line and consequently cause the operation of the sprung brake members. In particular, a pneumatic system for trailers has been considered, in which a servo-auto-modulator is connected to the outlet of the parking distributor and includes, in known manner, a non-return valve for enabling compressed air to flow from the supply line to an accumulator reservoir and a relay valve for applying braking pressure to the service brake members of the vehicle, which is controlled by a braking modulator device in dependence on the load bearing on the vehicle.

The use of a braking system with sprung parking-brake members on a trailer involves the need to prevent the brake members from being overloaded when the brake pedal of the tractor unit and the manual parking distributor are operated simultaneously.

The similar problem which occurs in braking systems for tractor units is currently resolved by the use of so-called "anti-overload" valves or distributors which enable the braking force due to operation of the brake pedal to be cancelled out when the hand brake is operated at the same time.

An anti-overload valve could also be used in a similar manner in a pneumatic system for a trailer which includes sprung parking-brake members.

SUMMARY OF THE INVENTION

The object of the present invention is to enable the functions of such an anti-overload valve to be achieved by means of a simple modification to a prior art servo-brake auto-modulator. More specifically, the object of the invention is to enable the functions of an anti-overload valve to be achieved in a servo-auto-modulator of the type comprising a body with first and second inlet apertures intended for connection to a pneumatic control line and a supply line respectively, an inlet/outlet aperture and an outlet aperture for connection to a pressure reservoir and to the brake members of the vehicle respectively; there being provided in the body a relay valve arranged to put the inlet/outlet aperture into communication with the outlet aperture;

a device for modulating the braking pressure, comprising an actuating piston movable in a control chamber communicating with the first inlet aperture and arranged to control the opening of the relay valve in dependence on the load bearing on the vehicle and on the pressure supplied to the first aperture of the body; and a non-return valve adapted for enabling compressed air to flow from the second inlet aperture to the inlet/outlet aperture to supply compressed air to the reservoir; the non-return valve comprising a one-way valve member carried by a distributor member which is movable in a chamber of the body which communicates with the first inlet aperture and the control chamber of the modulator, and which is arranged to assume a first position in which it allows communication between the first inlet aperture and the control chamber of the modulator device when compressed air is supplied to the second inlet aperture; and a second position in which it prevents communication between the first inlet aperture and the control chamber of the modulator when the air pressure upstream of the one-way valve falls below a predetermined value.

A servo-auto-modulator of this type, developed by the same inventor, is described in European patent application No. EP-A-0 221 031., which corresponds to U.S. Pat. No. 4,726,636.

In order to achieve the object mentioned above, the present invention provides a servo-auto-modulator of the above-specified type, the main characteristic of which lies in the fact that a discharge passage which communicates with the atmosphere is formed in the inlet chamber of the body in such a position that, in its second position, the control member causes the control chamber of the modulator device to be connected to the discharge passage, preventing overloading of the parking-brake members.

BRIEF DESCRIPTION OF THE DRAWINGS

Further characteristics and advantages of the invention will become clear from the detailed description which follows with reference to the appended drawings, provided purely by way of non-limiting example, in which.

DETAILED DESCRIPTION OF THE INVENTION

Figure 1:
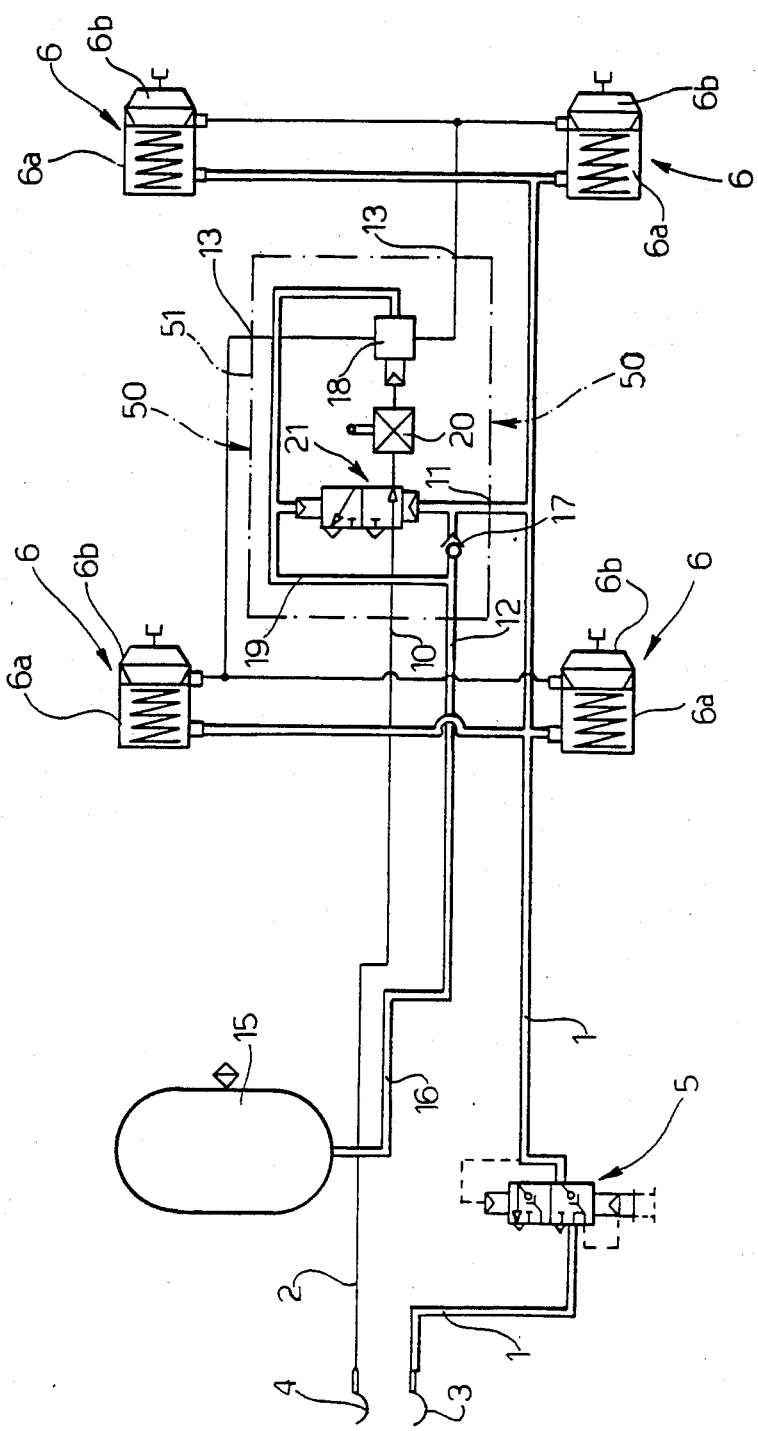
FIG. 1 is a schematic drawing of a two-line pneumatic braking system for a trailer including a servo-auto-modulator according to the present invention.

FIG. 1 shows a braking system for a trailer which comprises a supply or automatic line 1 and a brake-operating control line or variable line 2. These lines are intended for connection by means of junction 3 and 4 to the corresponding lines of the braking system (not illustrated) of a tractor unit.

A manually-controlled parking distributor, indicated 5, is interposed in the automatic line 1 and is connected to the spring-operated sections 6a of brake members 6 associated with the vehicle wheels. Each brake member includes a respective section, indicated 6b operated by compressed air.

The braking elements 6 are of know type and may, for example, be devices produced by the Applicant and marketed under the mark BFM 200. The outlet of the distributor 5 is also connected to the inlet of a servo-auto-modulator according to the invention, generally indicated 50 in FIG. 1. FIG. 1 shows a schematic drawing equivalent to this unit, which will be described in more detail from a structural point of view with reference to FIGS. 2 and 3. The unit includes a single body 51 with an inlet connector 10 connected to the moderable line 2, an inlet connector 11 connected to the automatic line downstream of the distributor 5, an inlet-outlet connector 12 connected to an accumulator reservoir 15 by means of tubing 16, and two outlet connectors 13 connected to the inlet connectors of the operating sections 6b of the brake members 6.

A non-return valve 17 is formed between the connectors 11 and 12 in the body 51 to allow compressed air to flow to the reservoir 15. Downstream of the valve 17, a branch line 19 leads to a relay valve 18 for enabling braking pressure to be applied to the operating sections 6b of the brake members. The relay valve is controlled by a braking modulator 20 in dependence on the load bearing on the motor vehicle and on the brake-operating pressure supplied to the inlet 10 of the servo-auto-modulator. A distributor 21 is interposed between the inlet of the modulator 20 and the inlet connector 10 and in FIG. 1 is represented by a two-position distributor controlled by the difference between the pressures existing upstream and downstream of the valve 17. The distributor 21 normally enables compressed air to pass from the inlet connector 10 to the modulator 20. If the pressure at the inlet 11 falls, the distributor disconnects the moderable pressure inlet 10 from the modulator 20 and connects the inlet of the latter to a discharge to the atmosphere.

Figure 2:
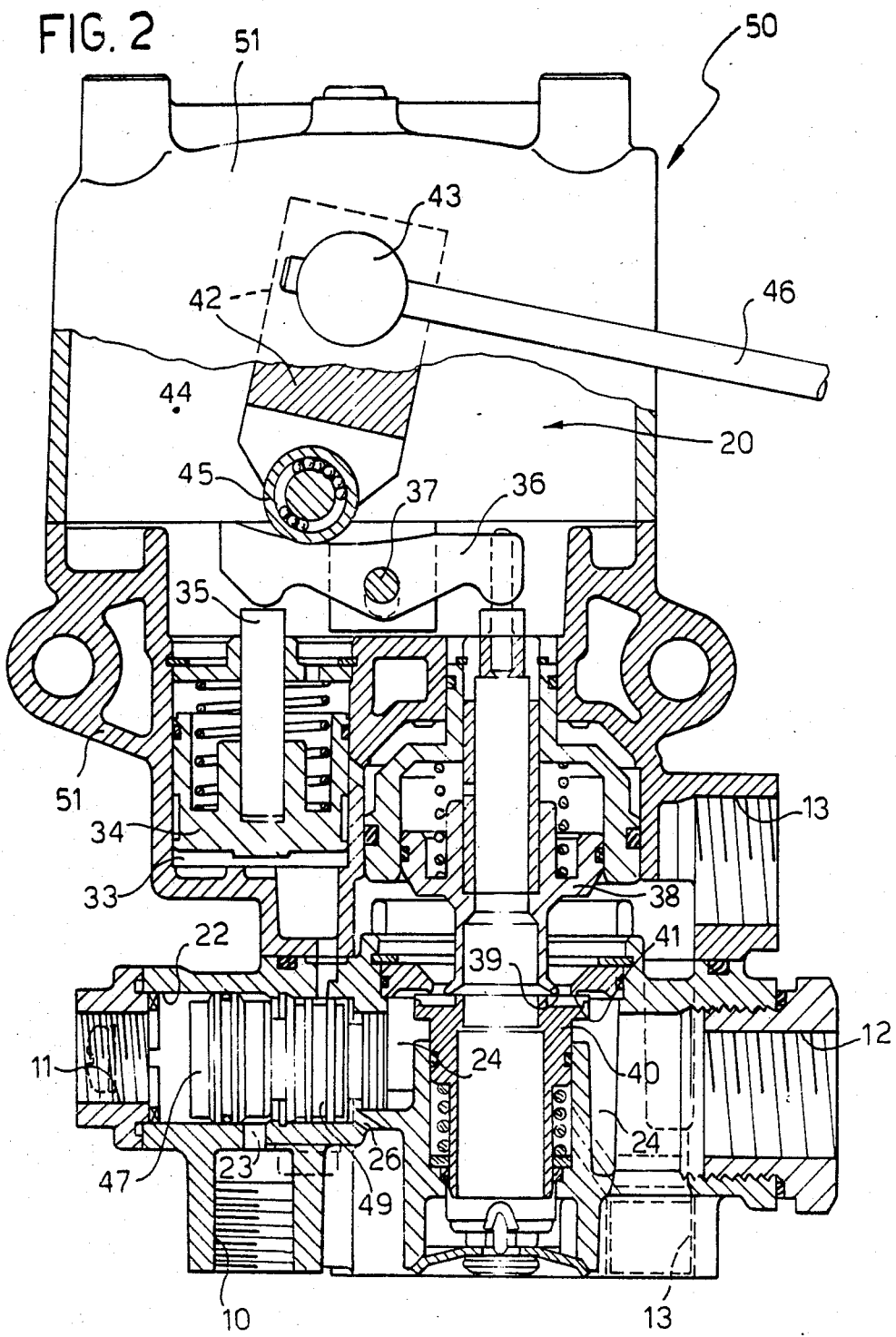
FIG. 2 is a partially-sectioned view of a servo-auto-modulator included in the system of FIG. 1.
Figure 3:
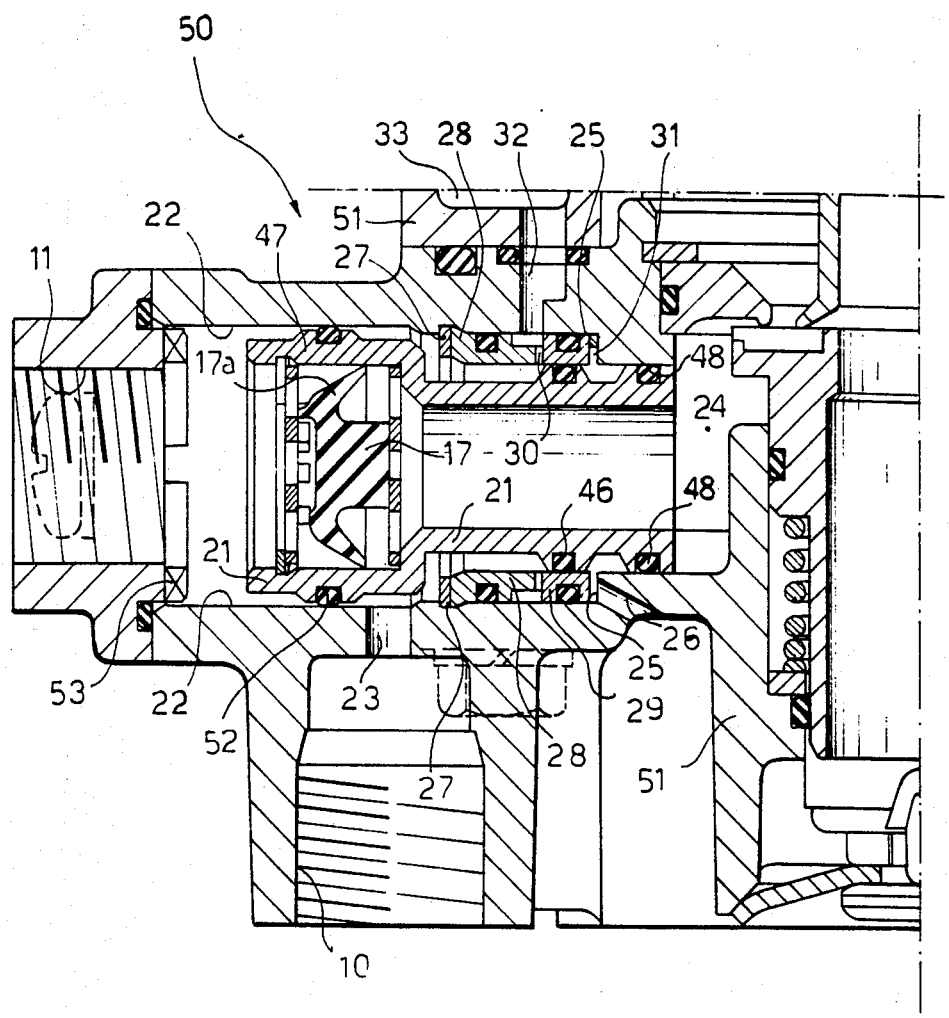
FIG. 3 is a section which shows a detail indicated II in FIG. 2 on an enlarged scale.

The servo-auto-modulator schematically illustrated in FIG. 1 may be produced according to the invention in the manner illustrated in detail in FIGS. 2 and 3, in which the same reference numerals have again been attributed to parts and components already described above.

In the body 51, the inlet connector 11 opens into a substantially cylindrical inlet chamber 22 the wall of which is formed with a lower aperture 23 which opens into the inlet connector 10. At its end opposite the inlet connector 11, the chamber 22 communicates with an annular chamber 24 which in turn communicates with the inlet/outlet connector 12 (FIG. 2). Adjacent the chamber 24 (FIG. 3), the wall of the chamber 22 forms a shoulder 25, in the lower portion of which a passage 26 is formed which passes through the wall of the body 51 and opens to the atmosphere.

Between the aperture 23 of the chamber 22 and the chamber 24, a stop ring 27 holds two annular elements indicated 28 and 29 in position. The annular element 28 is shaped so that it defines an annular passage 30 between it and the adjacent element 29. The element 29 defines an annular interspace 31 between it and the shoulder 25, which interspace communicates with the passage 26.

The inner surfaces of the elements 28 and 29 are flush with the end portion of the chamber 22 between the shoulder 25 and the chamber 24.

Finally, a further passage 32 is formed in the wall of the chamber 22 and faces the space 30 defined between the elements 28 and 29. The region inside the element 28 can be put into communication, through this space and the passage, with a chamber 33 which constitutes the control chamber of the braking modulator.

This modulator comprises a piston 34 which is movable in the chamber 33 and whose rod 35 cooperates with a first end of a rocker arm 36 which is pivoted with clearance at 37. The other arm of this rocker cooperates with a piston 38 which forms an annular valve seat 39 at its lower end which cooperates with an annular obturator 40 which is movable in the chamber 24. This obturator can also cooperate with a fixed seat 41 for controlling communication between the inlet/outlet connector 12 and the outlet connectors 13. The piston 38, the obturator 40 and the seat 41 together constitute the relay valve generally indicated 18 in FIG. 1.

The braking modulator finally includes a member 42 which is pivoted on a pin 43 in a chamber 44 formed in the upper part of the body 51. The lower end of the member 42 carries a rotatable roller 45 which can slide on the upper surface of the rocker arm 36. The angular position of the member 42 depends on the position assumed by a lever 46 fixed to a portion of the fulcrum 43 which projects from the body 51. This lever is intended for connection in known manner to an axle of the vehicle, while the body 51 is intended to be fixed to the suspended part of the motor vehicle. In this way, the position of the lever 46, and hence the point of contact of the roller 45 with the rocker arm 36, depend on the load bearing on the vehicle. The roller 45 acts as a movable fulcrum for the rocker arm 36; as the load varies, the effective lengths of the two arms of the rocker vary and thus the ratio of distribution of the force between the piston 34 and the piston 38 varies.

Returning now to the inlet chamber 22, a tubular distributor member 47 is sealingly slidable therein. More particularly, this distributor member includes a larger-diameter portion, mounted for sliding in the portion of the chamber 22 between the inlet connector 11 and the aperture 23, and a second, smaller-diameter portion, having two external annular projections with grooves which accommodate respective sealing rings indicated 48 and 49.

An elastomeric sealing member 17 is mounted in the larger-diameter portion of the member 47 and has an outer, annular, circumferential sealing lip 17a which cooperates with the internal surface of the tubular member 47. This member acts as a non-return valve and enables the passage of compressed air through the tubular member 47 only in the direction from the inlet connector 11 to the chamber 24 and thus to the inlet/outlet connector 12.

A sealing ring carried on the outside of the larger-diameter portion of the distributor member 47 is indicated 52 and cooperates with the wall of the chamber 22 to prevent communication between the inlet connectors 10 and 11.

The distribution member 47 performs the functions of the distributor indicated 21 in the schematic drawing of the servo-auto-modulator 50 shown in FIG. 1.

The distribution member is able to assume a normal working position, shown in FIGS. 2 and 3, when pressure is supplied to the inlet 11. In this position, the non-return valve 17 enables the flow of compressed air towards the inlet/outlet connector 12, and thus towards the reservoir 15. Moreover, in this condition, the inlet connector 10 is in communication with the control chamber 33 of the braking modulator through the aperture 23, an annular space defined between the distributor member 47 and the annular element 28, the space 30 and the passage 32. When a brake-operating pressure is applied to the inlet connector 10, the relay valve 38-41 is opened by means of the braking modulator and compressed air passes from the inlet/outlet connector 12 to the connectors 13 and thus operates the brake members with a force which depends on the load bearing on the vehicle.

If, during application of the service brakes, the parking distributor 5 is operated, the automatic supply line 1 is connected to the discharge. The connector 11 is consequently also put into communication with the discharge, and the distributor member 47 is thrust towards the left, against a stop ring 53 (FIG. 3), due to the difference in pressures which has been created between the chamber 24 and the connector 11 and as a result of the closure of the non-return valve 17. In this condition, the ring 49 is in contact with the internal surface of the annular element 28 to the left of the space 30 defined between this element and the adjacent annular element 29. The inlet connector 10 is thus disconnected from the passage 32 and therefore from the control chamber 33 of the braking modulator. In this condition, the sealing ring 48 is still to the right of the space 31 which faces the discharge passage 26. The control chamber 33 of the braking modulator is thus in communication with the atmosphere through the passage 32, the space 30 and the passage 26. In effect, in this situation, the space 30 faces the annular region between the two projections of the member 47 which carry the sealing rings 48 and 49.

As well as causing the discharge of the spring-operated sections 6a of the brake members 6, and thus actuation of the brake members by means of the springs, operation of the parking distributor 5, causes, as has been seen, the cancelling out of the braking pressure applied to the operating sections 6b of the brake members, preventing overloading of these members.

The servo-auto-modulator described above is thus also able to carry out the function of an anti-overload valve.

I claim:

1. A servo-brake auto-modulator for a trailer provided with a pneumatic braking system with a pneumatic supply line and a pneumatic control line, and with spring operated parking-brake members; the servo-auto-modulator comprising a body with first and second inlet apertures for connection to the control line and the supply line respectively, an inlet/outlet aperture and an outlet aperture for connection to a pressure reservoir and to the parking brake members of the trailer respectively; there being provided in the body a relay valve arranged to put the inlet/outlet aperture into communication with the outlet aperture;

a device for modulating the braking pressure, comprising an operating piston which is movable in a control chamber communicating with the first inlet aperture, and arranged to control the opening of the relay valve in dependence on the load bearing on the trailer and on the pressure supplied to the first inlet aperture; and a non-return valve arranged to enable the flow of compressed air from the second inlet aperture to the inlet/outlet aperture to supply compressed air to the reservoir; the non-return valve comprising a one-way valve member carried by a distributor member which is movable in an inlet chamber of the body which communicates with the second inlet aperture and the control chamber of the modulator, and which is adapted to assume a first position in which it enables communication between the first inlet aperture and the control chamber of the modulator device, when compressed air is supplied to the second inlet aperture; and a second position in which it prevents communication between the first inlet aperture and the control chamber when the air pressure upstream of the non-return valve falls below a predetermined value, the inlet chamber of the body being formed with a discharge passage which communicates with the atmosphere, the passage being in such a position that, in its second position, the distributor member causes connection of the control chamber of the modulator device to the discharge passage, preventing overloading of the parking brake members.

* * * * *